UNITED STATES PATENT OFFICE 2,461,463

TOLUENESULFONATES

Alfred W. Anish, Vestal, N. Y., assignor to General Aniline & Film Corporation, New York, N. Y., a corporation of Delaware No Drawing. Application December 29, 1945, Serial No. 638,495

3 Claims. (Cl. 260—456)

The present invention relates to the preparation of new toluenesulfonates. More particularly, the invention relates to aryloxyalkyl, arylthioalkyl, and arylselenoalkyl toluenesulfonates which may be represented by the following generic formula:

I
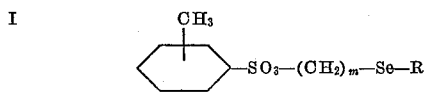

where CH₃ is in the meta-, para-, or ortho-position.

In the above formula R represents an aryl group of the benzene or naphthalene series, and m represents a small positive integer. More particularly, R may be benzene or naphthalene, or chlorobenzene, or phenyl substituted, for example, by methyl, methoxy, or a branched aliphatic chain as, for instance, di-isopropyl, di-isobutyl, tertiary-butyl or by a cycloaliphatic group as cyclohexyl; or by an aryl group as, for example, phenyl. More particularly, m may be 2 or 3.

The novel compounds comprising my invention may be employed as intermediates, for example, in the preparation of dye intermediates useful for the production of methine dyes such as those described in my application Serial No. 638,496 filed December 29, 1945. They are particularly useful in the production of methine dyes which do not wander or diffuse when employed in multilayer photographic coatings such as are utilized in color photography. Moreover, the dyes prepared from my novel intermediates are not displaced from the layer by color formers that may be present. Furthermore, the new intermediates yield dyes of increased molecular bulk without materially affecting the sensitization or speed of the dye.

The preparation of compounds of the structure of Formula I which comprise my invention can be generally affected by reacting meta-, ortho-, or para-toluenesulfonyl chloride in the presence of a base such as, for example, caustic soda or pyridine with an alcohol having the following formula:

II         R—Se—(CH₂)ₘ—OH where R and m have the same significance as in Formula I.

Suitable alcohols are arylselenoalkyl alcohols as, for example, β-phenylselenoethyl alcohol. In general, the reagents are employed in equimolecular proportions, although a slight excess of one or the other may be utilized.

The method of preparing the new toluenesulfonates is illustrated by the following examples in which the parts are by weight.

The arylselenoalkyl toluenesulfonates can be prepared by reacting selenophenols or substituted thiophenols or selenophenols with a halohydrin as, for example, ethylene chlorohydrin or trimethylene chlorohydrin in the presence of a sodium alcoholate as, for example, sodium methylate or sodium ethylate and then reacting the arylthioalkyl alcohol or arylselenoalkyl alcohol with ortho-, meta-, or para-toluenesulfonyl chloride in a manner similar to that illustrated in Example 1.

Example 1

40.2 parts of β-phenylselenoethyl alcohol and 42 parts of p-toluenesulfonyl chloride were dissolved in 32 parts of pyridine and 20.9 parts (0.11 mol) of p-toluenesulfonyl chloride were added while stirring. The temperature was kept below 5° C. while adding the latter agent and the stirring continued for an additional 3 hours at a temperature under 20° C. After standing for 12 hours, the reaction solution is poured into 60 parts of a concentrated hydrochloric acid diluted with 140 parts of water. The white solid was filtered off, washed with 2N caustic alkali solution and finally with cold water. After drying, the solid was recrystallized from petroleum ether B. P. 90°–100° C. There was isolated β-phenylselenoethyl p-toluenesulfonate which has the following formula:

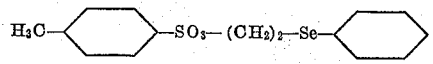

Example 2

21.5 parts of γ-phenylselenopropyl alcohol and 42 parts of p-toluenesulfonyl chloride were reacted by employing the procedure of Example 1. There was isolated γ-phenylselenopropyl p-toluenesulfonate having the following formula:

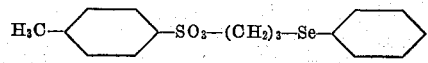

By following the same procedure as in the above examples, but substituting meta- or ortho-toluenesulfonyl chloride for the p-toluenesulfonyl chloride, there are obtained the corresponding meta- and ortho-toluenesulfonates; as for instance, β-phenylselenoethyl meta- and ortho-toluenesulfonates, γ-phenylselenopropyl meta- and ortho-toluenesulfonates, etc.

It will be evident from the examples herein given how other varieties of compounds of structural Formula I may be prepared and it is accordingly to be understood that the invention is not limited by the specific examples above set forth.

I claim:

1. A toluenesulfonate having the following general formula:

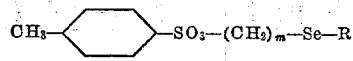

wherein R represents a member selected from the class consisting of benzene and naphthalene series, and $m$ represents a positive integer ranging from 2 to 3.

2. β-phenylselenoethyl p-toluenesulfonate.
3. γ-phenylselenopropyl p-toluenesulfonate.

ALFRED W. ANISH.

REFERENCES CITED

The following references are of record in the file of this patent:

UNITED STATES PATENTS

| Number | Name | Date |
|---|---|---|
| 2,172,606 | Butler | Sept. 12, 1939 |
| 2,266,141 | Adams | Dec. 16, 1941 |

FOREIGN PATENTS

| Number | Country | Date |
|---|---|---|
| 537,921 | Great Britain | June 14, 1941 |

OTHER REFERENCES

Peacock, "Jour. Chem. Soc." (London) 1928, pp. 2303 to 2305.

Nair, "Jour. Indian Chem. Soc.," vol. 12, pp. 318–321 (1935).

Tipson, "Jour. Org. Chem.," vol. 9, pp. 235–241 (1944).